(12) United States Patent
Rouskov et al.

(10) Patent No.: US 8,402,508 B2
(45) Date of Patent: Mar. 19, 2013

(54) DELEGATED AUTHENTICATION FOR WEB SERVICES

(75) Inventors: Yordan Rouskov, Kirkland, WA (US); Michael Guo, Bellevue, WA (US); Rui Chen, Kirkland, WA (US); Kyle Young, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 12/060,869

(22) Filed: Apr. 2, 2008

(65) Prior Publication Data

US 2009/0254978 A1 Oct. 8, 2009

(51) Int. Cl.
*H04L 29/06* (2006.01)
(52) U.S. Cl. .................... 726/2; 726/4
(58) Field of Classification Search .............. 726/4, 2; 709/229; 713/159
See application file for complete search history.

(56) References Cited

U.S. PATENT DOCUMENTS

| | | | |
|---|---|---|---|
| 6,247,026 B1 * | 6/2001 | Waldo et al. ..................... 1/1 |
| 6,510,451 B2 | 1/2003 | Wu et al. |
| 7,076,558 B1 * | 7/2006 | Dunn ........................ 709/229 |
| 7,188,252 B1 * | 3/2007 | Dunn ........................ 713/182 |
| 7,290,278 B2 | 10/2007 | Cahill et al. |
| 2003/0061404 A1 | 3/2003 | Atwal et al. |
| 2003/0069967 A1 | 4/2003 | Vincent |
| 2003/0149781 A1 | 8/2003 | Yared et al. |
| 2003/0196087 A1 * | 10/2003 | Stringer et al. ............... 713/171 |
| 2004/0003072 A1 * | 1/2004 | Mathew et al. ............... 709/223 |
| 2004/0073801 A1 * | 4/2004 | Kalogridis et al. .......... 713/176 |
| 2004/0088578 A1 | 5/2004 | Chao et al. |
| 2006/0265720 A1 | 11/2006 | Cai et al. |
| 2007/0101145 A1 * | 5/2007 | Sachdeva et al. ............. 713/176 |
| 2009/0158393 A1 * | 6/2009 | Llorente et al. .................. 726/3 |

FOREIGN PATENT DOCUMENTS

WO 2007043920 A1 4/2007

OTHER PUBLICATIONS

"MyProxy Credential Management Service", http://grid.ncsa.uiuc.edu/myproxy/delegation/.
"Exchange Web Services and Delegate Access", http://msdn2.microsoft.com/en-us/library/bb204081.aspx.
Dean, "Authentication for Web Services", Dated Jan. 26, 2006, pp. 1-2, http://66.102.9.104/search?q=cache:_lx3H6D49gkJ:www.w3.org/2005/Security/usability-ws/papers/32-dean-auth-for-web-services/+%22Authentication+for+web+services%22&hl=en&ct=clnk&cd=6.
Wang, et al., "Extending the Security Assertion Markup Language to Support Delegation for Web Services and Grid Services", ICWS, Proceedings of the IEEE International Conference on Web Services, Year of Publication: 2005, pp. 67-74.

* cited by examiner

*Primary Examiner* — Ali Abyaneh (57) ABSTRACT

Embodiments of the claimed subject matter provide a method and an apparatus for enabling delegated authentication for web services. Delegated authentication is provided without divulging the information the user requires to complete an authorization procedure of another web service or otherwise subjecting the user to unnecessary risk. Furthermore, delegated authentication is granted for a limited duration and access is subject to further limitations to prevent unnecessary intrusion to the user, the user's data, and the host web service. One embodiment of the claimed subject matter is implemented as a method for enabling delegated authentication to allow a third party service access to protected data on a host service. A user attempting to utilize functionality of a third party website that requests access to the user's data stored on a separate host website is enabled as a delegate with authorization to access the data stored on the host website.

28 Claims, 6 Drawing Sheets

DELEGATED AUTHENTICATION FOR WEB SERVICES

BACKGROUND

The evolution of the Internet as a network of distributed computers and computerized devices has revolutionized the practice of a seemingly limitless number of services and applications. Principal among these is the capacity to share and store large amounts of data online with remote accessibility. Stored online data has grown to encompass personal as well as private data. Naturally, providing security for this data has become a growing concern.

The unauthorized trafficking of personal and private data has become a potentially lucrative (albeit illegitimate) endeavor, resulting in the rampant and widespread occurrence of identity theft and internet fraud. Accordingly, many popular online services now include enhanced security measures to thwart the increasing sophistication of malicious Internet users. Unfortunately, as security measures have grown more elaborate to meet the demands for more effective protection, the procedures for validating legitimate users have become increasingly complex, tiresome, and user-intensive as a result.

The problem is exacerbated when legitimate users who wish to utilize the functionality of a third party website or online application that requires access to the user's data stored ("hosted") on another website. The functionality of the third party website cannot be enabled without bypassing the existing privacy and security protection provided by the host website where the data is stored. Often, express user consent is required to allow access to the website to fetch the user's data. However, repeated attempts to utilize the functionality of the third party website would require a separate authorization for each attempt, a process that can be inefficient and frustrating to the user. One solution to this problem is known as delegated authentication.

Delegated authentication is the ability to establish authorization between users and third party applications. Typically with services providing delegated authentication, the third party website the user is attempting to utilize acts as a delegate of the user to access the data on the user's behalf. The user provides information to the delegate application that allows the application to bypass the authentication procedures on the host website. Generally, the delegate third website accesses the date either through an application or gadget on their website, or through direct server to server communication.

This information commonly includes the user's unique identification (such as the user's unique account name and password) established with the host website. Often, this information is stored with the third party application, so that the user's subsequent utilizations would not require separate and additional authorization with the host website. In the subsequent utilizations, the delegate third party retrieves the user's stored identification information and automatically accesses the host website and obtains the requisite data.

However, this method of delegated authentication presents its own security concerns, since a typical delegate application would possess virtually limitless access to the user's account on the host website, and may not necessarily be limited to accessing only the user-requested data. Unscrupulous third party applications may be able to use the data for unauthorized purposes. Furthermore, even legitimate third party applications may have their own security compromised, subsequently resulting in increased security risks for their users.

Moreover, websites and applications offering delegated authentication services may not offer user-supplied controls and limits to the access. Users may intend to only allow delegated authentication for specific purposes and/or during specific times, such as when the user is actively attempting to utilize (e.g., is "logged in to") the third party application. However, the account information may be stored and exploitable by the third party application even while the user is "offline," or for months or even years after the period of time the user intended to allow access.

With current delegated authentication schemes, the procedure of entering in the user's account identification information must be repeated with each additional intended delegate application. In addition to the inherent inefficiency of repeating substantially similar (or even identical) procedures, the risks involved would also increase with each additional delegate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The claimed subject matter is directed to enabling delegated authentication for web services. Specifically, the claimed subject matter provides a method of enabling delegated authentication to allow a third party web service access to data stored on a host service while simultaneously limiting the scope and duration of the access to provide greater control to the owner of the data.

One embodiment of the claimed subject matter is implemented as a method for enabling delegated authentication to allow a third party service access to protected data on a host service. A user attempting to utilize functionality of a third party website that requests access to the user's data stored on a separate host website is enabled as a delegate with authorization to access the data stored on the host website. The authorization is limited in scope and duration, specified by either the user or the host website, or both, to refine and control the access to the user's data available to the third party service.

Delegated authentication is enabled by establishing permission with the user to allow authorization for the delegate web service to access the user's data stored on a separate host website. A request to establish permission is facilitated by a user-interface by which the user can set certain parameters for data access, such as the defined scope and duration of the access. The user is able to consent—either explicitly or implicitly—to the request and grant permission for the third party (now the delegate) service to access the user's data according to the parameters set by the user. Once permission is established, the request for access to the user's data is validated by the host service based on a delegation token. The delegate service is granted access for the duration as specified by the delegation token following validation.

Another embodiment of the claimed subject matter provides a method for establishing permission of the user for allowing a third party service access to the user's data stored on a separate host website during the course of enabling delegated authentication.

To establish permission according to this embodiment, a host service receives a request to access a user's data by a third party service. The host service also receives an offer detailing the scope, duration and purpose of the access. The offer is presented to the user, who is able to accept, reject or modify the offer. The host service sends a delegation token to the third party service with parameters pursuant to the user's response.

In another embodiment, the claimed subject matter is implemented as a system that stores a user's information and allows external applications with delegated authority access to the user's information according to predetermined, specific parameters. This embodiment includes one or more databases which store the user's data as well as information for the internal management of establishing and validating permissions for the external application. This embodiment also includes one or more interfaces used to communicate with the external application and the user.

DETAILED DESCRIPTION

Reference will now be made in detail to the preferred embodiments of the claimed subject matter, a method and apparatus for enabling delegated authentication for web services, examples of which are illustrated in the accompanying drawings. While the claimed subject matter will be described in conjunction with the preferred embodiments, it will be understood that they are not intended to be limited to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the claimed subject matter provide a method and an apparatus for enabling delegated authentication for web services. Delegated authentication is provided without divulging the information the user requires to complete an authorization procedure of another web service or otherwise subjecting the user to unnecessary risk. Furthermore, delegated authentication is granted for a limited duration and access is subject to further limitations to prevent unnecessary intrusion to the user, the user's data, and the host web service. Embodiments of the claimed subject matter and their benefits are further described below.

Figure 1:
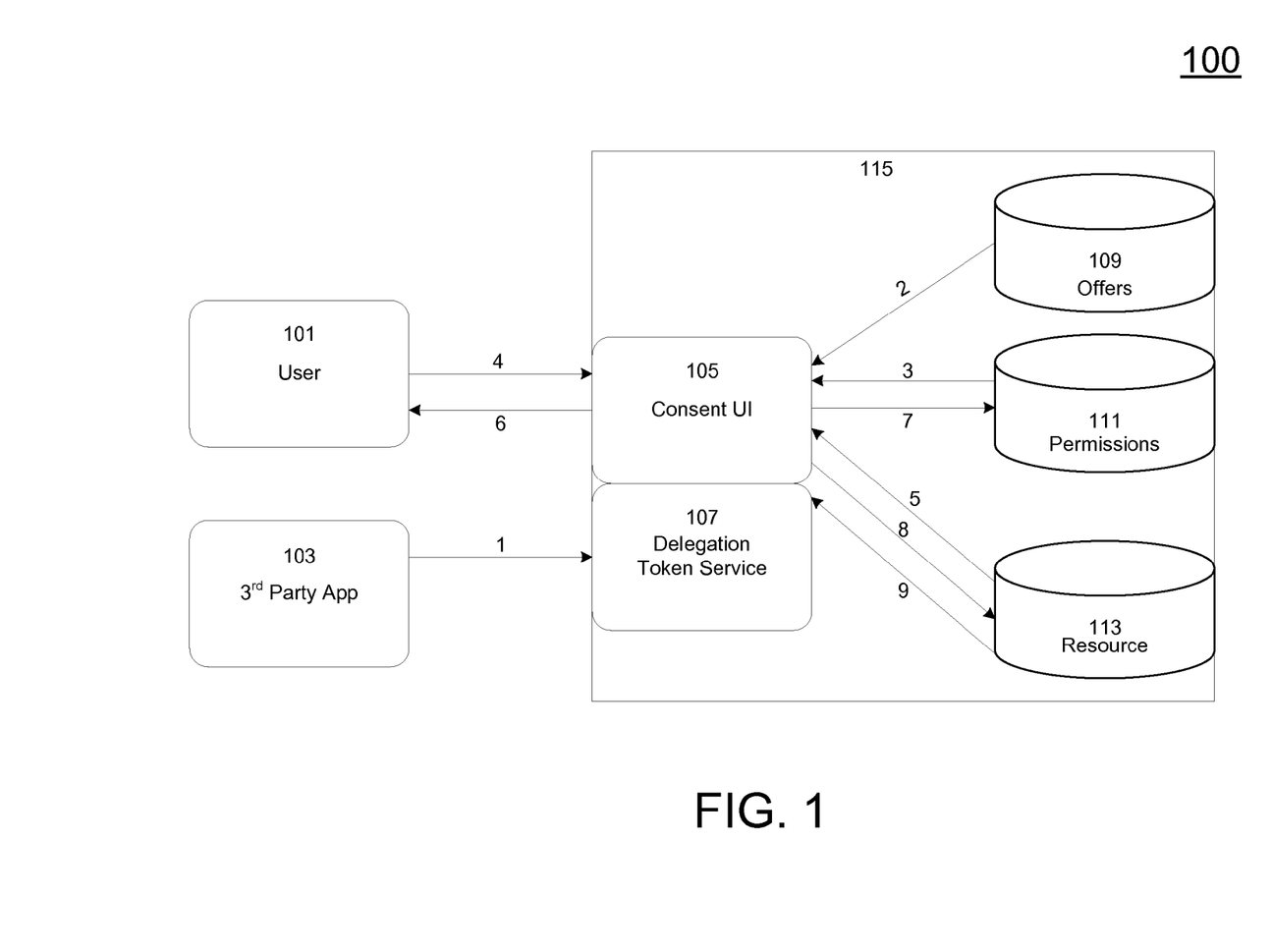
FIG. 1 is a diagram describing a system for attempting to establish permission to enable delegated authentication for web services in accordance with the various embodiments herein described.

FIG. 1 is a diagram describing a system 100 for attempting to establish permission to enable delegated authentication for web services in accordance with the various embodiments herein described.

According to the system 100 of FIG. 1, a third party application 103 attempting to access data belonging to a user 101 stored in a security-enabled system 115 sends (1) a request for a delegation token to the system 115. The user 101 may be attempting to access a third party application 103 via a remote computing device such as a desktop or laptop computing system. The third party application may, for example, be an online website or a local application running on the user 101's computing system. According to the system 100, the security-enabled system 115 is implemented with a consent user interface 105, a delegation token service 107 and an offers database 109, a permissions database 111 and a data resource 113. In one embodiment, the data resource 113 is implemented as a database.

The delegation token is a set of data that signifies the preferences of the user 101. Each token is specific to the user 101 and the third party application 103 requesting the token and the data resource 113 to which access is being requested.

In one embodiment, the delegation token utilizes encryption technology so that delegation tokens cannot be self-manufactured. In addition, each token has a limited duration, so that even if the third party application 103 is compromised, and their tokens unlawfully seized, the tokens would eventually expire, thereby reducing the risk to each user 101.

According to some embodiments, the user 101 has an established private account with the security-enabled system 115. The private account may, for example, be comprised of a unique user identification name and password. To access the data belonging to the user 101 stored in the security-enabled system 115, the user 101 or a delegate must "log in" to the security-enabled system 115 via an authentication procedure that verifies the user's identification.

According to the system 100 of FIG. 1, the request is received by the security-enabled system 115 in a delegation token service 107. The third party application 103 may send the request in response to a user 101 attempting to utilize functionality provided by the third party application 103 which requires the user's data stored in the security-enabled system 115.

In one embodiment, the stored data may be the uploaded photographs of the user 101, the security-enabled system 115 may be a website which functions as a repository for digital photographs and the third party application 103 may be the website upon which the user 101 would like the photographs displayed. In another embodiment, the stored data is a list of contacts including contact information such as addresses and phone numbers. In this embodiment the third party application 103 may be a website through which the user 101 would like to provide notice to the contacts of the user 101 for an event or occasion.

The third party application 103 requests permission from the user 101 to access a data resource 113 in accordance with a pre-defined offer. The offer is a predefined set of information or actions on the data resource 113 that the third party requests authorization to access or perform. The offer may also contain information to explain to the user 101 the data involved and any implications that may result from granting permission for access. The predefined information may include the duration the access should be granted, and the scope of the access, (e.g., any sets or subsets of data the third party application 103 is specifically interested in obtaining). Offers are generated (2) by processes within the security-enabled system 115. According to some embodiments, offers are also stored in an offer database 109.

In some embodiments, the request from the third party 103 to access information is accomplished by requesting consent from the user based on a pre-defined offer. The consent user interface 105 references (3) a permissions database 111 to determine whether the user has previously given consent to the third party for that offer that the consent is within the originally provided scope of access, and that the access has not exceeded the allowed duration (i.e., expired). The consent user interface 105 also references a permissions database 111 to determine whether the offer has already been denied access or revoked.

A valid offer previously permitted access, within the original consented scope and not exceeding the allowed duration is allowed access to the data of the user 101, limited to the set or sets of data specified in the offer. A previously rejected offer is summarily dismissed. All other offers not allowed access or dismissed are presented (4) to the user 101. The user 101 is presented the offer details, including the purpose, scope and duration of the request. The offer details may also include potential hazards or risks involved with providing access to the specific third party applications 103.

In another embodiment, granular consent (i.e., the user 101 is able to further limit the scope of consent beyond what was presented in the offer) is available. According to this embodiment, the consent user interface 105 obtains (5) the details from the resource database to confirm any impending specifications issued by the user 101. The user 101 grants or denies (6) permissions for the presented offer and the response of the user 101 is received by the consent user interface 105. In the case of granular consent the user 101 can grant access to subset of the data (e.g. one folder of photos). According to some embodiments, the response of the user 101 to the presented offer is stored (7) in a permissions database 111.

The consent user interface 105 sends acknowledgement to the resource database 113 of the authorized access. The authentication procedure of the security-enabled system 115 is completed using the identification information of the user 101. The requested information, including the information granularly consented to, is located and prepared (8) in the data resource 113. A third party application 103 is granted permission and allowed access to the data of the user 101, subject to the limitations provided in the offer definition. The requested information is retrieved from the data resource 113 is distributed (9) to the third party application 103. The third party application 103 can receive an updated delegation token by presenting the prior delegation token to the delegation token service 107. If the consent is still valid, the delegation token service 107 will respond to the third party application 103 with an updated delegation token.

Figure 2:
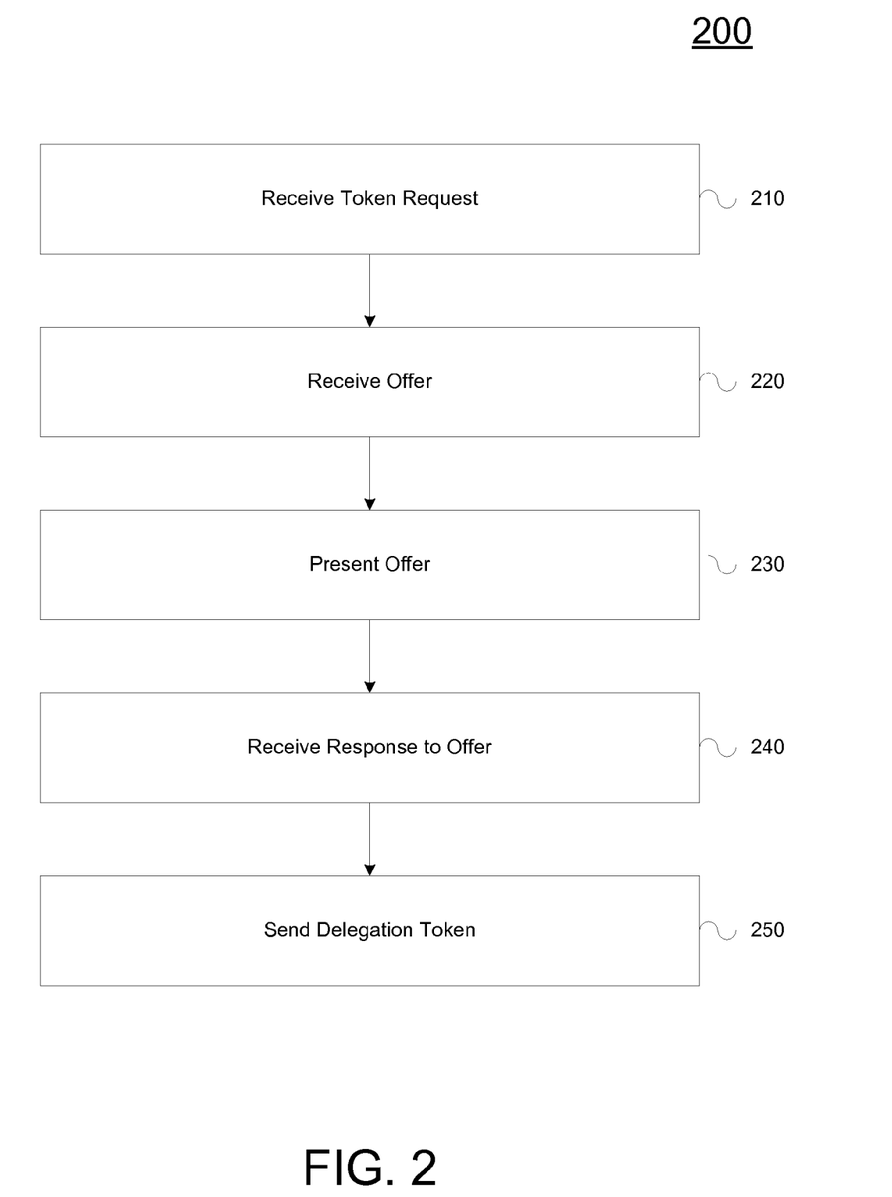
FIG. 2 is a flowchart describing the process for attempting to establish permission for a third party application to act as a delegate of a user to access the data of the user stored in a security-enabled system in accordance with various embodiments of the claimed subject matter.

FIG. 2 is a flowchart describing the process 200 for attempting to establish permission for a third party application 103 to act as a delegate of a user 101 to access the data of the user 101 stored in a security-enabled system 115 in accordance with various embodiments of the claimed subject matter. Steps 210-250 describe exemplary steps comprising the process 200 in accordance with the various embodiments herein described.

According to the process 200 of FIG. 2, a request from a potential delegate third party application 103 to obtain access to a security-enabled storage system 115 for the stored data of a user 101 is received by the security-enabled storage system 115 at step 210. The request may be sent by the third party application 103 in response to a user 101 attempting to utilize functionality provided by the third party application 103 which requires the user's data stored in the security-enabled system 115. In one embodiment, the request from a potential delegate third party application 103 is to obtain a delegation token which permits or denies access to the data of the user 101 stored in the security-enabled storage system 115. The request from the third party application 103 will result in the consent request to the user from the consent UI 105.

At step 220, the third party application 103 makes a request for data access by referencing a pre-defined offer. The offer is a predefined set of information or actions (defined within the processes of the system 115) that the third party references as part of the data access request. The offer may also contain information to explain to the user the purpose of and procedure required to obtain the access. The predefined set of information may include the duration the access should be granted, and the scope of the access, (e.g., any sets or subsets of data the third party application 103 is specifically interested in obtaining).

In some embodiments, some or all of a total set of offers is predefined and stored in a database, such as the offer database 109 of FIG. 1. After receiving the data access request that references a pre-defined offer from the third party application 103, at step 220, the security-enabled system 115 matches the referenced offer with the corresponding offer in the offer database 109. The definition of the offer, including the purpose, scope and duration of the offer is then retrieved from the offer database 109.

At step 230, the offer and the definition of the offer is presented to the user 101. The offer communicates to the user the procedure that will designate the third party application 103 as a delegate and allow it access to the protected data of the user 101 stored in the security-enabled system 115, as well as the purpose of the third party application 103 in its acquisition of the protected data. Limits to the access, such as scope—such as specific content or file types (e.g., documents, digital photographs), and duration may be included in the offer presentation.

According to one embodiment, an offer definition includes features for the specific separation or delineation of certain files in the security-enabled system 115. These features allow the user 101 the capability for granular consent. In this embodiment, the user 101 is able to consent to specific allowances within an offer. Accordingly, the offer is presented to the user with the designated data that the user 101 may restrict the access of the third party application 103 to. For example, an offer that includes a folder of documents may have limited consent to certain files or subfolders within the folder, rather than the entire contents of the folder. In this case, the delineation may be performed by the offer database 109 with reference to the stored data, or by the user 101.

At step 240, the response from the user 101 is received by the security-enabled system 115. The user 101 may explicitly consent to the offer of the third party application 103 and authorize the designation of the third party application 103 as a delegate with access to the material, as limited by the offer. Alternatively, the user 101 may also explicitly reject the offer of the third party application 103. According to one embodiment, the response of the user 101 is stored in a permissions database, such as the permissions database 111 of FIG. 1.

According to a further embodiment, in addition to granting explicit consent, the user 101 may be able to implicitly consent to an offer from a third party application 103. An administrator of a set of users may set consent for a given offer for all users within the set. In a further embodiment, an administrator may grant implicit consent to all users within the set to a specific set of third party applications for a given offer. The user 101 may be one of the set of users managed collectively by the administrator (e.g., employees of a company within the same domain). When the pre-approved offer is received by any user in the set of users, consent will be automatically granted, without input from the user (although notice may still be given to the user).

At step 250, the security-enabled system 115 sends a delegation token to the third party application 103. The delegation token includes delegation token specific parameters, dictated by the response of the user 101. Delegation token specific parameters may include data or metadata such as a form of encryption, the scope of consent given by the user 101, the digital signature of the third party application 103, the duration that access is allowed, and the associating offer(s) and the definitions of the associating offer(s). The delegation token is encrypted to prevent unauthorized duplication or fabrication. The scope of consent may include the specifically defined data access is restricted to, as well as information which may facilitate the extension of granular consent to the user.

In embodiments that include the ability for a user 101 to grant implicit consent, the third party application 103 can simply request a delegation token from the security-enabled system 115. If the third party application 103 has been granted implicit consent, the security-enabled system 115 will provide the token directly, without invoking the Consent UI 105.

Figure 3:
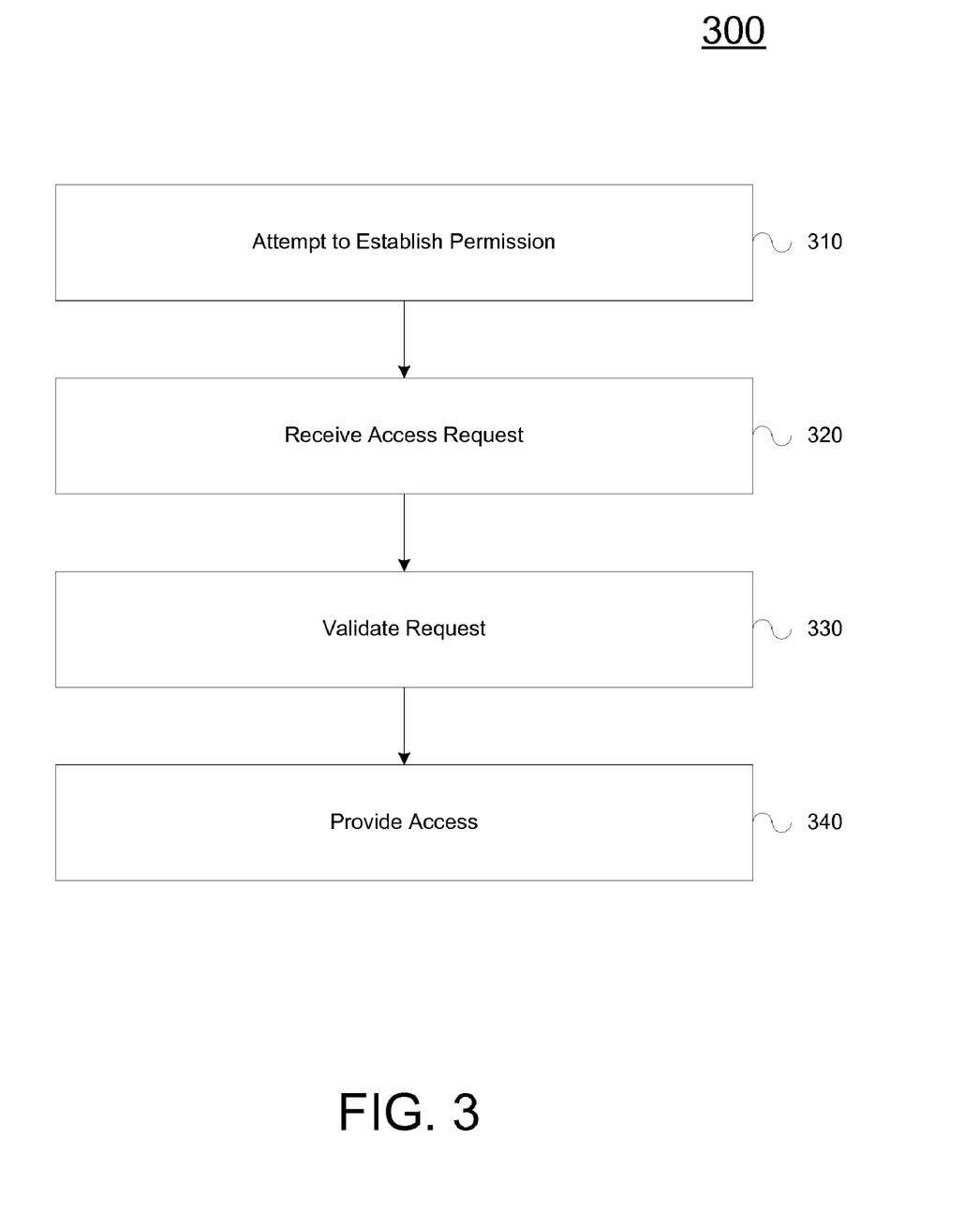
FIG. 3 is a flowchart describing the process for enabling the delegated authentication of a third party application to access the data of a user stored in a security-enabled system in accordance with various embodiments of the claimed subject matter.

FIG. 3 is a flowchart describing the process 300 for enabling the delegated authentication of a third party application 103 to access the data of a user 101 stored in a security-enabled system 115 in accordance with various embodiments of the claimed subject matter. Steps 310-330 describe exemplary steps comprising the process 300 in accordance with the various embodiments herein described.

At step 310, a security-enabled system 115 attempts to establish permission (i.e., gain consent) from the user 101 for a third party application 103 to access protected data of the user 101 stored in the security-enabled system 115. Permission is established upon receiving a request for a delegation token and an offer from the third party application 103. According to one embodiment, the received offer includes the definition of the offer, which provides the parameters of the offer such as the scope, duration and purpose of the access to the protected data. In other embodiments, a pre-stored database of offer definitions is referenced, and the definition corresponding to the offer received from the third party application 103 is retrieved.

The offer and corresponding definition is presented to the user 101 who is able to consent to the access, deny the access and, in some embodiments, further refine the consent to provide granular consent. The response of the user 101 is received by the security-enabled system 115 and an encrypted delegation token comprising the parameters of the response of the user 101 is exchanged with the third party application 103.

In one embodiment, a third party application 103 with a delegation token from the security-enabled system 115 may omit step 310 to establish permission and proceed directly to step 320. At step 320, a request from the third party application 103 to access the protected data of the user 101 is received by the security-enabled system 115. The request includes the exchange or display of the delegation token provided to the third party application 103, as established in step 310.

At step 330, the request from the third party application 103 to access the protected data of the user 101 is validated by reviewing the parameters of the delegation token. If the request has delegation token with a valid delegation token, the security-enabled system 115 proceeds to step 340. Otherwise, invalid or expired delegation tokens are rejected and denied access to the requested data belonging to the user 101.

If the request of the third party application 103 is validated at step 330, the third party application 103 is designated as a delegate of the user 101 for the matter provided by the delegation token only. Access to the data of the user 101 subject to the limitations provided by the delegation token is granted to the third party application 103 at step 340 for the duration specified by the delegation token. In one embodiment, the data of the user 101 is stored in the data resource 113 of the security-enabled system 115.

Figure 4:
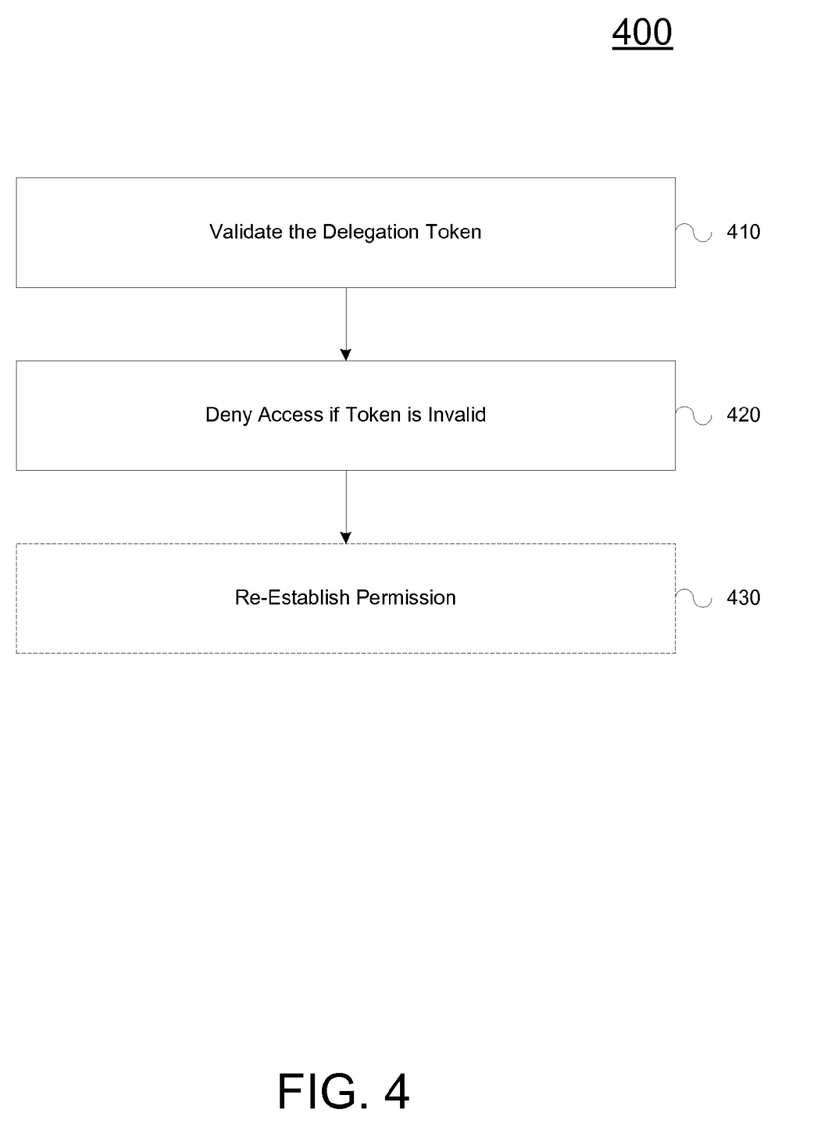
FIG. 4 is a flowchart describing the process of validating a request from a third party application with an encrypted delegation token to act as a delegate of the user and access the data of a user stored in a security-enabled system 115 in accordance with various embodiments.

FIG. 4 is a flowchart describing the process 400 of validating a request from a third party application 103 with an encrypted delegation token to act as a delegate of the user 101 and access the data of a user 101 stored in a security-enabled system 115, as detailed in the step 330, in accordance with various embodiments. Steps 410-440 describe exemplary steps comprising the process 400 in accordance with the various embodiments herein described At step 410, the delegation token of the third party application 103 seeking access is validated. Validation may consist of comparing the parameters of the request and the metadata of the delegation token with a stored set of permissions corresponding to the identification of the delegation token. In some embodiments, sets of permissions are stored in a permissions database 111. The permissions database 111 is referenced when a request accompanied by a delegation token is received. A delegation token is deemed valid when the parameters of the delegation token is consistent with the parameters stored in the permissions database 111 corresponding to the identification of the delegation token (i.e., the scope of the accessible data according to the stored permissions corresponding to the delegation token is not exceeded by the data requested and the duration of the delegation token has not expired).

At step 420, the request of the third party application 103 to act as a delegate of the user 101 and access the protected data of the user 101 in the security-enabled system is denied if the token was invalidated at step 410. In some embodiments, a failed validation may prompt the exchange of error codes to the third party. Error codes may, for example, include "Invalid AppID/Domain," signifying the invalidity of the ID or the domain name of the application; "Invalid Delegation Token" if the token is invalid; "Expired Delegation Token" if the token has exceeded its duration; "Expired Permission" if the token allows permission to one or more discrete pieces of data that is no longer available, or where the user 101 has since revoked permission; "Expired Offer" if the offer is no longer available, or where the user 101 or security-enabled system 115 has since revoked permission entirely for that offer; and "Offer not valid with the requested API" if the offer of the third party application 103 references an offer that is invalid for that application.

In another embodiment, the denial of access may be accompanied by further security measures (e.g., providing notice to the user 101 of the attempt to access the data of the user 101, the source of the attempt, the specific data requested, etc.).

In some embodiments, a delegation token with an expired duration that is otherwise valid (i.e., the scope of content requested was consistent with stored permissions) will attempt to re-establish the permission of the user 101 to allow the third party application 103 to act as a delegate of the user at step 430. The attempt to re-establish the permission of the user will follow the procedure to establish permission in a manner consistent with the foregoing description of FIG. 2, repetition of which is herein omitted.

Figure 5:
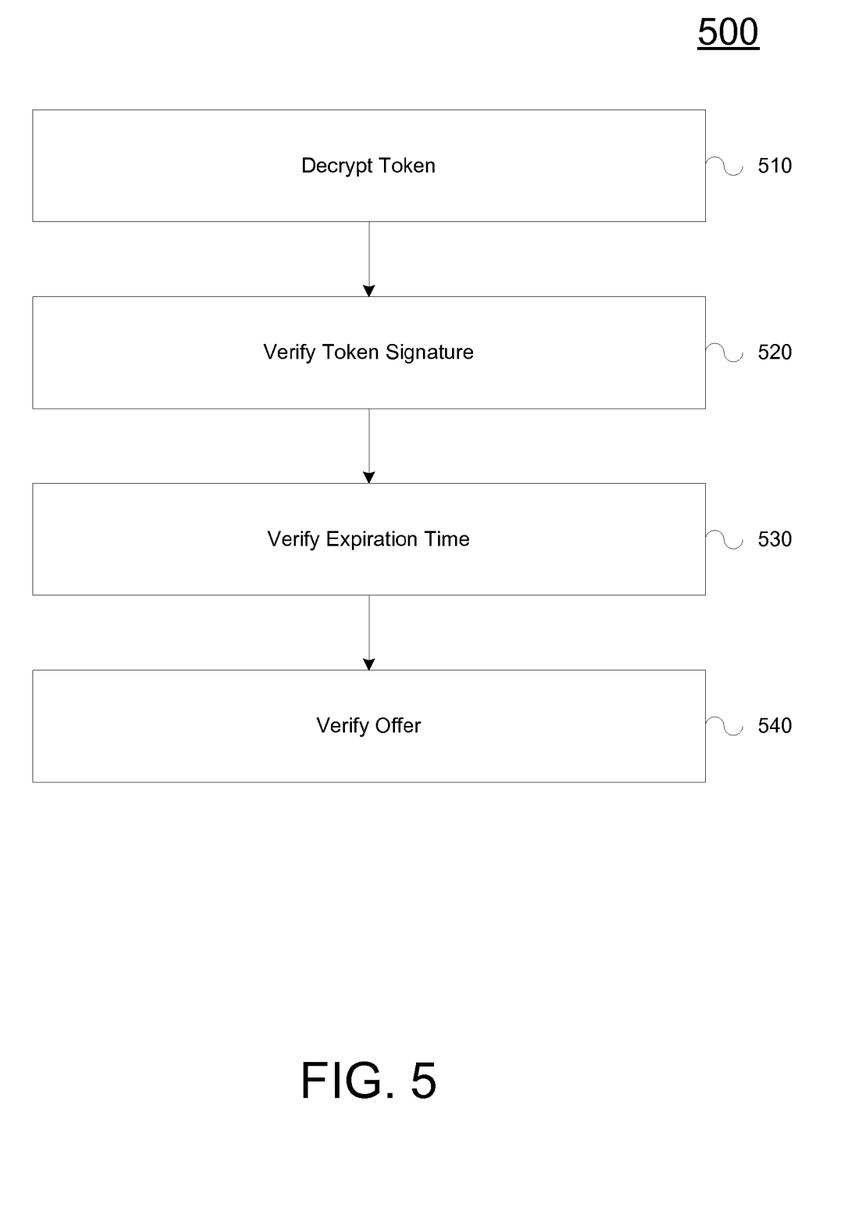
FIG. 5 is a flowchart describing the process of validating an encrypted delegation token of a third party application that accompanies a request from the third party application to act as a delegate of the user and access the data of a user stored in a security-enabled system, in accordance with various embodiments.

FIG. 5 is a flowchart describing the process 500 of validating an encrypted delegation token of a third party application 103 that accompanies a request from the third party application to act as a delegate of the user 101 and access the data of a user 101 stored in a security-enabled system 115, as detailed in the step 410, in accordance with various embodiments.

At step 510, the delegation token is decrypted by the security-enabled system 115. In some embodiments, the decryption occurs in a delegation token service 107 of a security-enabled system 115. In one embodiment, the decryption of the delegation token allows access to token-information, including the signature of the token, the token's duration (time until expiration) and the offer associated with the token.

At step 520, the decrypted token signature is verified by the security-enabled system 115. The signature of the decrypted token must be consistent (i.e., match identically) with data corresponding to the delegation token stored in the security-enabled system 115. In one embodiment, the data corresponding to a delegation token is stored in the offer database 109.

At step 530, the expiration time of the decrypted token is verified. Verification of the duration of the decrypted token may be accomplished for example, with reference to the permissions database 111. The permissions database 111 is referenced to verify that the permitted term for the third party application 103 for the offer specified in the delegation token has not expired.

At step 540, the offer encapsulated in the delegation token is verified. In one embodiment, verification of the offer is performed by comparison with reference to the offer database 109 and the permissions database 111. Verification consists of determining if the delegation token contains an offer definition that is consistent with the definition corresponding to the offer stored in the offer database 109, and that the third party application 103 requesting access has been granted permission for that offer, as provided with reference to the permissions database 111.

Figure 6:
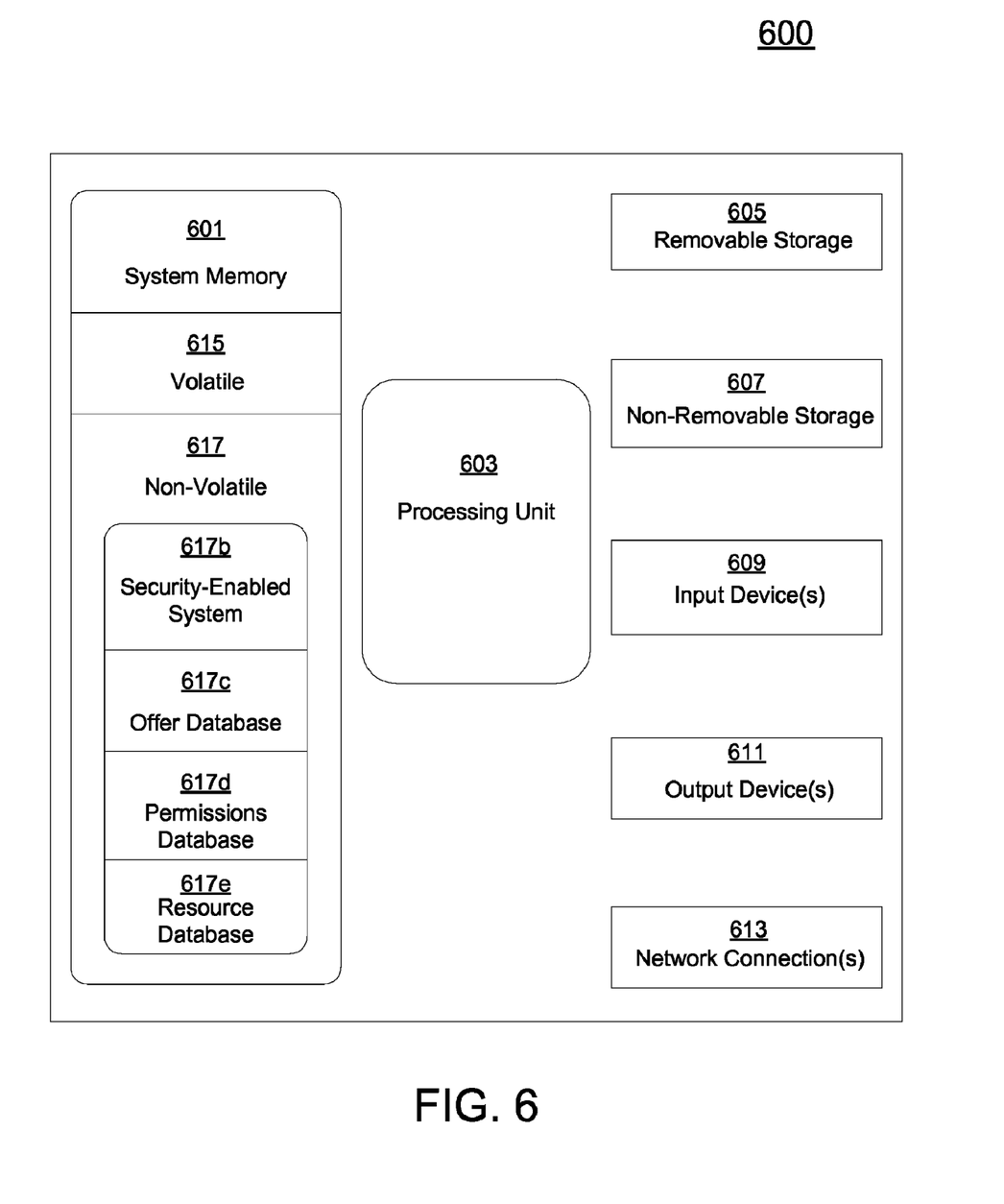
FIG. 6 shows an exemplary computing device according to various embodiments.

FIG. 6 shows an exemplary computing device 600 according to various embodiments. Computing device 600 depicts the components of a basic computer system providing the execution platform for certain software-based functionality in accordance with various embodiments. Computing device 600 can be an environment upon which the security-enabled system 115 from various embodiments is instantiated. In addition, computer device 600 can be an environment upon which the third party application 103 is implemented, as a website, for example.

Computing device 600 can be implemented as, for example, a desktop computer system, laptop computer system or server computer system. Similarly, computing device 600 can be implemented as a handheld device (e.g., cellphone, etc.) Computing device 600 typically includes at least some form of computer readable media. Computer readable media can be a number of different types of available media that can be accessed by computing device 600 and can include, but is not limited to, computer storage media.

In its most basic configuration, computing device 600 typically includes processing unit 603 and memory 601. Depending on the exact configuration and type of computing device 600 that is used, memory 601 can be volatile (such as RAM) 615, non-volatile 617 (such as ROM, flash memory, etc.) or some combination of the two. In one embodiment, a security-enabled system 617*b* is instantiated in the non-volatile memory 617. The security-enabled system 617*b* may include an offer database 617*c*, which includes definitions for some or all of a set of offers known and acceptable to the security-enabled system 617*b*. The security-enabled system 617*b* may also include a permissions database 617*d*, comprising the list of authorized delegate third party applications and their corresponding authorized offers. In addition, the security-enabled system 617*b* may include an resource database 617*d*, which stores the data of the user 101 that a third party application 103 must be granted delegate status for access.

Additionally, computing device 600 can include mass storage systems (removable 605 and/or non-removable 607) such as magnetic or optical disks or tape. Similarly, computing device 600 can include input devices 609 and/or output devices 611 (e.g., such as a display). Additionally, computing device 600 can include network connections 613 to other devices, computers, networks, servers, etc. using either wired or wireless media. As all of these devices are well known in the art, they need not be discussed in detail.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for attempting to establish permission to enable delegated authentication for web services, the method comprising:
receiving an access request in a host application executing on a first computing system from a delegate application executing on a second computing system to access protected data stored on the first computing system, the protected data comprising a plurality of units of data;
determining whether the delegate application has been pre-approved to access the protected data;
automatically granting access to the protected data to the delegate application when the delegate application has been pre-approved;
when the delegate application has not been pre-approved to access the protected data:
 a) receiving a request that references an offer from the delegate application to access the protected data;
 b) referencing an offer database for a definition of the offer comprising a plurality of parameters, the plurality of parameters including at least one of: a scope and a duration of the access;
 c) presenting the offer referenced by the delegate application to an owner of the protected data via a user interface executing on a third computing system;
 c) receiving a response from the owner of the protected data to the requested offer from the delegate application, the response comprising a user-selection of units of the protected data for which access is granted;
 d) providing access to the protected data to the delegate application based on the response to the owner; and
 e) sending a delegation token to the delegate application, the delegation token defining an access to the protected data for the delegate application based on the response of the owner of the protected data,
wherein c) presenting the offer referenced by the delegate application to the owner comprises presenting potential hazards or risks to the owner from granting access to the delegate application.

2. The method according to claim 1, wherein receiving a response from the owner of the protected data further comprises recording the response from the owner of the protected data to the offer from the delegate application.

3. The method according to claim 2, wherein the response from the owner of the protected data is recorded in a database.

4. The method according to claim 1, wherein the delegation token further comprises:
a form of encryption;
a scope of consent;
a signature;
a duration; and
an association with one or more offers.

5. The method according to claim 4, wherein existing permissions are stored within a database.

6. The method according to claim 1, wherein determining whether the delegate application has been pre-approved to access the protected data comprises checking stored permissions for corresponding existing permissions.

7. The method according to claim 1, wherein the delegation token sent to the delegate application indicates the owner of the protected data's consent or lack thereof.

8. The method according to claim 1, wherein presenting the offer from the delegate application to the owner of the protected data further comprises presenting the definition of the offer, wherein the definition is provided by the offer from the delegate application or is retrieved from an offer database.

9. The method according to claim 1, wherein the response from the owner of the protected data comprises an automatic pre-approval.

10. The method according to claim 9, wherein the owner of the protected data comprises a user of a plurality of users comprising an associated user group collectively managed by an administrator, and wherein the automatic pre-approval comprises an implicit consent established by the administrator for users of the associated user group.

11. The method according to claim 1, wherein presenting the offer referenced by the delegate application to the owner of the protected data via a user interface executing on the third computing system comprises presenting, in the user interface, a plurality of files comprised in the protected data identified by the scope of the offer.

12. The method according to claim 1, wherein presenting the offer referenced by the delegate application to the owner of the protected data via a user interface executing on the third computing system comprises presenting a user interface operable to allow the owner of the protected data to granularly consent to specific units of data comprising the protected data by selecting units of the protected data from the offer to grant access to.

13. The method according to claim 1, wherein providing access to the protected data to the delegate application based on the response to the owner comprises providing access to the protected data that does not include the selected units of the protected data.

14. A method for enabling delegated authentication to allow access to a protected data, the method comprising:
establishing permission from an owner of the protected data for a delegate service to access the protected data via an exchange of a delegation token by receiving, in a first computing system in which the protected data is stored, an access request and a pre-defined offer sent from a delegate service executing on a second computing system and seeking access to the protected data;
presenting the offer to the owner via a user interface on a third computing system;
receiving a response of the owner, the response comprising a user-selection of units of the protected data for which access is granted;
sending a delegation token based on the response of the owner to the delegate service that provides a plurality of parameters defining the access allowed to the delegate service, the offer being sent from the delegate service by referencing an offer database to obtain a definition of the offer comprising at least one of: a scope and a duration of the access;
validating the delegation token of the delegate service to access the protected data; and
providing access to the protected data when the request of the delegate service to access the protected data is valid,
wherein presenting the offer comprises presenting potential hazards or risks to the owner from granting access to the delegate application.

15. The method according to claim 14, wherein establishing permission from the owner of the protected data for the delegate service to access the protected data further comprises an attempt made by the owner of the protected data to utilize functionality of a delegate service that requires access to protected data in a storage service, the attempt occurring during a period of time prior to the time permission is established.

16. The method according to claim 14, wherein, establishing permission for the delegate service to access protected data further comprises checking stored permissions for an existing permission corresponding to the received offer.

17. The method according to claim 14, wherein validating the delegation token of the delegate service to access the protected data further comprises denying access if the delegation token is invalid.

18. The method of claim 14, wherein validating the delegation token further comprises:
   decrypting the token;
   verifying a token signature corresponding to the token;
   verifying an expiration time corresponding to the token; and
   verifying the offer corresponding to the token.

19. The method of claim 14, wherein validating the delegation token further comprises obtaining another delegation token if an allowed duration corresponding to the current delegation token has expired.

20. The method according to claim 14, wherein the establishing permission from the owner of the protected data comprises receiving an automatic pre-approval.

21. The method according to claim 20, wherein the owner of the protected data comprises a user of a plurality of users comprising an associated user group collectively managed by an administrator, and wherein the automatic pre-approval comprises an implicit consent established by the administrator for users of the associated user group.

22. A system for enabling delegated authentication for web services, the system comprising:
   a computer system having a processor coupled to a memory, the memory having computer readable code, which when executed by the processor causes the computer system to implement a storage application for facilitating delegated authentication to allow access to protected data,
   wherein, the storage application receives a request and an offer obtained by referencing an offer database to obtain a definition of the offer comprising at least one of a scope and a duration of the offer from a delegate application to access the protected data, presents the offer from the delegate application to an owner of the protected data, receives a response from the owner of the protected data to the offer from the delegate application, and sends a delegation token to the delegate application that provides a plurality of parameters defining any access allowed to the delegate service,
   wherein, when presenting the offer from the delegate application to the owner of the protected data, potential hazards or risks to the owner from granting access to the delegation application are also presented
   further wherein the response comprises a user-selection of units of the protected data for which access is granted.

23. The system according to claim 22, wherein the access request and the offer are sent from a remote computing device.

24. The system according to claim 23, wherein the remote computing device is a computer system.

25. The system according to claim 23, wherein the remote computing device is a hand-held computing device.

26. The system according to claim 23, wherein the access request and offer is sent via the Internet.

27. The system according to claim 22, wherein the response from the owner of the protected data comprises an automatic pre-approval.

28. The method according to claim 27, wherein the owner of the protected data comprises a user of a plurality of users comprising an associated user group collectively managed by an administrator, and wherein the automatic pre-approval comprises an implicit consent established by the administrator for users of the associated user group.

* * * * *